United States Patent Office 2,727,155
Patented Dec. 13, 1955

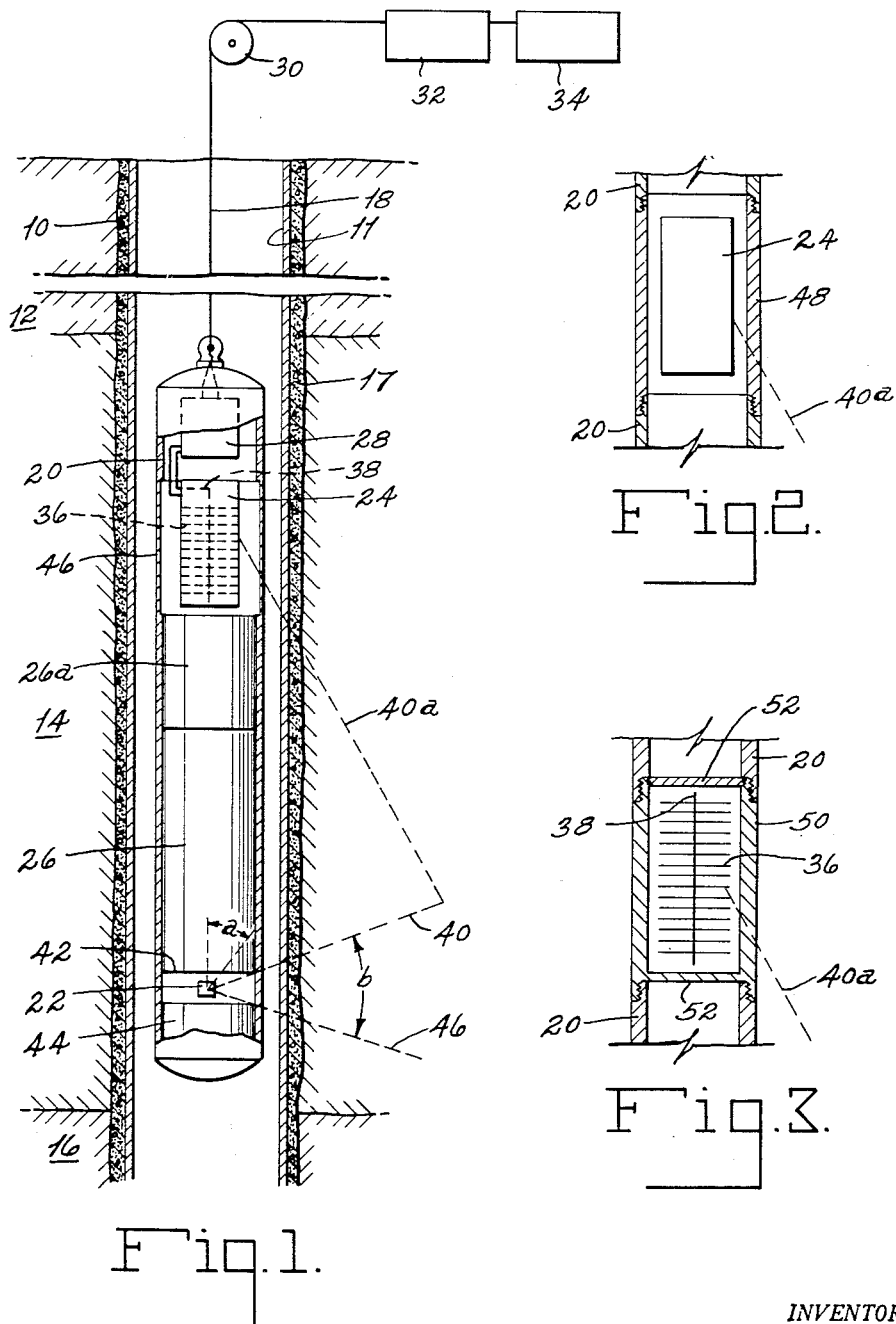

2,727,155

SCATTERED GAMMA RAY WELL LOGGING

Gerhard Herzog, Houston, and Alexander S. McKay, Bellaire, Tex., assignors to The Texas Company, New York, N. Y., a corporation of Delaware Application March 3, 1951, Serial No. 213,754

2 Claims. (Cl. 250—83.6)

This invention relates to a method and an apparatus for logging the formations traversed by a well bore hole to obtain information as to the nature and characteristics of these formations. The principal object of the invention is the provision of such a method and a logging instrument by means of which more accurate readings of the densities of the subsurface formations can be obtained than has been possible with the methods and equipment which have been used heretofore, and regardless as to whether or not the hole is provided with a casing.

In scattered gamma ray logging, or gamma ray-gamma ray logging as it is sometimes called, a source of gamma radiation such as a small quantity of radium or the like is passed through the bore hole while disposed within an instrument housing. In accordance with the methods which have been used heretofore, a gamma ray detector such as a conventional Geiger-Mueller counter or an ionization chamber is also disposed within the instrument housing and separated from the source by a shield designed to absorb those gamma rays which might otherwise pass from the source directly to the detector. Means are provided for transmitting the output of the detector to the surface where it is amplified and recorded on a moving film or tape in correlation to the depth of the instrument in the bore hole and the record so made then becomes a log of the traversed formations showing by the intensities and the variations in the intensities of the measured scattered gamma rays certain information as to the nature of the formations such as the densities thereof and the location of the boundaries of these formations. This is made possible by the fact that gamma rays emitted by the source penetrate the formations whereby, depending upon certain characteristics such as the density and atomic number of the substances making up the formations, more or less of the gamma rays will be scattered or diffused, some of these returning to the bore hole to strike, or be intercepted by, the detector.

It has been found that the quality of the present scattered gamma ray log can be greatly improved, and careful study and experimentation has brought to light factors which enter into this type of logging and which when properly worked out will contribute to such a greatly improved log. This log will be more accurate when made at the same logging speed as in the methods used heretofore or will provide a log of equal accuracy when made at greater logging speeds. It has been found, for instance, that the percentagewise change in the detector response between different formations varies considerably with the distance between the source and the detector. Thus since the density and atomic number of materials usually change in the same direction, it is safe to assume that an increase in the detector response indicates a decrease in the density of the surrounding formation providing, of course, that the diameter of the bore hole remains substantially constant. It has also been found that a much more accurate log will be obtained, i. e., the difference in the densities of different formations will be shown much more clearly where the gamma rays from the source pass outwardly into the formations in a more or less horizontal or radial direction so that the scattered gamma rays will be forced to travel through a relatively large amount of the formation before they strike the detector. To state this in a slightly different way, it has been found that the character of the log is greatly reduced if the gamma rays from the source are permitted to impinge on the surrounding formation directly in the vicinity of the counter.

It has also been found that since substantially all of the scattered gamma rays will have energies less than 1 mev., to detect these gamma rays with the highest possible efficiency, a detector of the electrical pulse producing or counter type should be used in which the cathode electrode is of the multi-plate type such as is disclosed in the U. S. Letters Patent No. 2,397,071, granted March 19, 1946, to D. G. C. Hare and also in which the cathode plates are formed of a high atomic number metal such, for example, as tantalum. In order to obtain the maximum efficiency, the cathode plates should be as thick as the free path of the electrons ejected from the cathode material when struck by gamma rays but not thicker than this amount since with thick plates many of the electrons will be absorbed before they can pass out into the surrounding gas to produce ionization thereof.

It has been found, in addition, that better detector response is obtained where that portion of the instrument housing surrounding the detector is made reasonably thin so that there will be less chance that the scattered gamma rays will be absorbed in the material of the housing before they reach the detector. This effect can be obtained in other ways such as by forming that portion of the housing surrounding the detector of a metal relatively transparent to gamma rays of low energy. Still another way of accomplishing this result is to combine in one unit the detector housing with that portion of the instrument housing surrounding the detector.

For a better understanding of the invention reference may be had to the accompanying drawings in which Figure 1 is a vertical sectional view through a portion of a bore hole showing an instrument embodying the principles of this invention suspended therein;

Figure 2 is a partially sectional elevation through a portion of a modified form of a logging instrument, and Figure 3 is a view similar to Figure 2 showing still another modification of the logging instrument.

Referring to the drawing, a bore hole 10 provided with a casing 11 is shown as traversing several subsurface formations such as those indicated at 12, 14 and 16. A layer 17 of cement may or may not be present around the casing. Suspended within the bore hole by means of a conductor cable 18 is an elongated instrument housing 20 containing a source 22 of gamma rays, e. g., a small amount of radium, a scattered gamma ray detector 24, a shield 26 between the source and the detector and a preamplifier 28. The output of the detector 24 leads to a preamplifier 28 and the output of the latter is conducted upwardly through the cable 18 to the surface. At the surface, the cable passes over a suitable measuring reel or drum 30 which indicates or records the amount of cable payed out and thus the depth of the instrument 20 in the hole. The cable 18 then passes to a suitable amplifier 32 the output of which is led to an indicator or a recorder 34 of any suitable type.

As stated hereinbefore the detector 24 is preferably in the form of a high efficiency gamma ray counter of the type disclosed in the aforementioned patent to D. G. C. Hare. This detector contains essentially a plurality of parallel separated cathode plates or discs 36 provided with one or more series of aligned holes through which an anode wire 38 is positioned. The cathode and anode electrodes are disposed within a suitable sealed case or envelope also indicated by the reference character 24 and which contains a suitable ionizable gas. In the illustration of Figure 1 only one anode 38 is shown for purposes of simplicity.

Gamma rays from the source 22 such as the one indicated at 40 pass into the surrounding formations wherein they may be scattered, with some of them such as the one indicated at 40a passing back to the bore hole to strike the detector 24. This scattered gamma ray may strike one or more of the cathode plates 36 to cause an electron to be ejected therefrom to produce ionization of the gas and thus an electrical pulse. These pulses are preamplified at 28 and then conducted to the surface to the amplifier 32 after which they may be recorded at 34 as on a moving tape or film. If desired, the device 30 may also be connected to the recorder 34 as by the well known Selsyn motors so that indications will be placed on the record strip at intervals showing the depth of the logging instrument in the hole.

The cathode plates 36 are preferably formed of a high atomic number metal such as tantalum, lead or the like, as it has been found that such a cathode material is more efficient than a low atomic number metal for detecting gamma rays of low energies such as scattered gamma rays. It is also preferred that the thickness of each of the cathode plates 36 should be chosen to give the maximum efficiency for detecting low energy gamma rays. Thus, the thickness of each plate should not be greater than the free path of the electrons ejected in the metal. It has been found that where tantalum is used plate thickness of approximately 4 mils is very satisfactory for detecting gamma rays having energies of 1 mev. or less.

Another important feature of this invention resides in the spacing between the source 22 and the detector 24. Experiments have indicated a continuous percentagewise increase in counting rate changes between different formations as the source to counter spacings are increased from 9 to 27 inches. Of course, this improvement with distance is eventually balanced by the loss in counting rate due to the absorption of the gamma rays in the formations and it has been found that a counter, say, 15 inches long with an 18 inch separation between the source and the near end of the counter is very satisfactory. It is preferred that the source-detector separation be from two to three times the diameter of the bore hole 10.

Still another feature of the invention resides in the shape and position of the shield 26 with respect to the source 22. In the past the shield which has been placed between the source and the detector has been positioned so that the end of the shield which is closest to the source is still some little distance away from the source, sometimes as much as several inches. The gamma rays emitted by the source which are not absorbed in this shield are therefore free to pass outwardly into the formations over a wide range and many of these gamma rays pass upwardly and slightly outwardly at an acute angle to the axis of the bore hole. It has been found that a much poorer log results when the gamma rays from the source are allowed to impinge directly on the surrounding formation in the immediate vicinity of the counter and after considerable experimenting it was proven that the best logs are obtained when the source is positioned from one-half to one inch from the near end of the shield, the shield having a flat, i. e., a substantially horizontal surface at the end closest to the source. If desired, the lower end of the shield 26 may be slightly conical with the source 24 placed at the apex of the cone. It will be observed with reference to Figure 1 of the drawing that the lower surface 42 of the shield 26 is flat and separated from the source 22 by a relatively small distance, for example, one-half to one inch. With the source 22 and the detector 24 disposed substantially coaxially with the bore hole 10 the gamma rays which enter the formations are those such as the one illustrated at 40 which pass outwardly at an angle which is greater than the 45° angle indicated at a. As illustrated in Fig. 1, the angle between the gamma ray 40 and the axis of the hole is about 70° and it is preferred that the gamma rays be restricted to paths between 60° and 90° with respect to the hole axis. Since these gamma rays pass outwardly more or less radially with respect to the hole the scattered gamma rays 40a are forced to pass through a relatively large amount of the formations being bombarded or, in other words, the path 40a is generally long as compared to the path 40. As stated above, due to this feature of forcing the scattered gamma rays to pass through a relatively large amount of the formation a much better log results than is obtained where the gamma rays from the source are permitted to pass outwardly and upwardly at angles of 45° or less to the axis of the hole.

If desired, a shield member 44 may be placed directly below the source 22 to reduce the personal radiation hazard. The shield 44 will have little if any effect upon the log since the chances are not great that gamma rays such as the one indicated at 46 passing more or less downwardly into the formation will be scattered up to the detector. With the provision of the two shields 26 and 44, as illustrated, the gamma rays which pass outwardly into the formations are restricted to those which pass outwardly in the form of an annular, more or less radial beam, i. e., those within the angle b.

It is preferred that at least that portion of the gamma ray absorbing shield 26 closest to the source 22 have high absorbing power for the gamma rays. It has been found that tungsten, because of its high density makes a very efficient shield for this purpose. If desired, the portion of the shield closest to the detector 24, i. e., the portion 26a may be formed of a slightly less dense material such as lead. Again the shield 44 below the source 22 may, if desired, be formed of lead rather than tungsten.

Since the scattered gamma rays 40a are of relatively low energy, generally below 1 m. e. v., and the majority having energies below .5 m. e. v., it is desirable that as little as possible gamma ray absorbing material be disposed in the path of these scattered gamma rays. To this end that portion 46 of the instrument housing 20 in the near vicinity of the detector 24, i. e., that portion which surrounds the detector may be made thinner than the remainder of the housing. With this provision fewer of the scattered gamma rays will be absorbed in the material of the housing before they reach the detector 24.

In Figure 2 is shown a slight modification of that portion of the instrument in the vicinity of the detector 24. In this modification a section 48 of the housing 20 is made of a metal which is relatively transparent to the scattered gamma rays. The housing section 48 may, for example, be formed of Duralumin, an aluminum-copper-magnesium alloy which has a high tensile strength but which has a much lower absorbing power for the low energy gamma rays than a metal such as brass or iron. Another metal which is satisfactory for the housing portion 48 is Dowmetal, an alloy of magnesium, aluminum, manganese, and zinc. The tubular portion 48 may be provided with threaded ends so that it can be screwed into the upper and lower portions of the regular housing 20.

In Fig. 3 still another modification is disclosed in which a portion 50 of the housing 20 and the envelope or housing of the detector 24 are formed as one unit. As will be seen in that figure the housing section 50 is provided with upper and lower closure members or covers 52 to provide a sealed envelope for the cathode 36 and the anode 38 of the detector. With this arrangement, particularly where the housing portion 50 is formed of a metal relatively transparent to scattered gamma rays, the unwanted absorption of the scattered gamma rays can be reduced to a minimum.

It has also been found that a clearer and more accurate log will be obtained where a monochromatic source 24 is used, i. e., a source emitting gamma rays having a narrow range of energies.

Operational tests have shown that by incorporating the features described in the foregoing, improved scattered gamma ray logs can be obtained even where the bore hole is provided with a casing and even where the casing is surrounded by a layer of cement. If desired, the gamma ray absorbing effect of the casing, the cement and the drilling mud in the hole can be determined and compensated for by following generally the method disclosed in our application Serial No. 217,238, filed March 23, 1951, now Patent No. 2,686,188.

With the improved features which have been described, an instrument has been provided for use in scattered gamma ray logging of bore holes which is considerably more efficient than those which have been used heretofore.

Obviously many modifications and variations of the invention as hereinbefore set forth may be made without departing from the spirit and scope thereof, and only such limitations should be imposed as are indicated in the appended claims.

We claim:

1. An instrument for logging the formations traversed by a well bore hole comprising an elongated housing adapted to be passed through said hole while suspended from a conductor cable, a source of gamma rays disposed on the vertical axis of said housing, a gamma ray detector also disposed in said housing and vertically spaced from said source by a distance from two to three times the diameter of the bore hole and a gamma ray absorbing shield between said source and said detector, the lower end of said shield being substantially horizontal and spaced from said source approximately one inch so that gamma rays from the source which pass into the surrounding formations to be scattered upwardly to said detector will travel outwardly into the formations in a substantially annular radial beam.

2. The method of logging the formations traversed by a well bore hole which comprises bombarding said formations by gamma rays from a source passed through the bore hole, measuring, in a zone vertically separated from said source by a distance at least two times the diameter of the bore hole, gamma rays which are scattered in said formations and returned to said zone, and restricting the gamma rays bombarding the formations to those which pass outwardly from the source at an angle from 60° to 90° to the axis of the bore hole.

References Cited in the file of this patent

UNITED STATES PATENTS

| | | |
|---|---|---|
| 2,302,247 | Neufeld | Nov. 17, 1942 |
| 2,308,361 | Fearon | Jan. 12, 1943 |
| 2,469,462 | Russell | May 10, 1949 |
| 2,508,772 | Pontecorvo | May 23, 1950 |

OTHER REFERENCES

Gamma-Ray Well Logging, Fearon, Nucleonics, April 1949, pages 67–75.

R. S. I., December 1936, vol 7, pages 441–449.